US012190905B2

(12) United States Patent
Rao et al.

(10) Patent No.: US 12,190,905 B2
(45) Date of Patent: Jan. 7, 2025

(54) SPEAKER RECOGNITION WITH QUALITY INDICATORS

(71) Applicant: PINDROP SECURITY, INC., Atlanta, GA (US)

(72) Inventors: Hrishikesh Rao, Atlanta, GA (US); Kedar Phatak, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 118 days.

(21) Appl. No.: 17/408,281

(22) Filed: Aug. 20, 2021

(65) Prior Publication Data

US 2022/0059121 A1    Feb. 24, 2022

Related U.S. Application Data

(60) Provisional application No. 63/068,685, filed on Aug. 21, 2020.

(51) Int. Cl.
*G10L 25/60* (2013.01)
*G06N 20/20* (2019.01)
*G10L 15/02* (2006.01)

(52) U.S. Cl.
CPC .............. *G10L 25/60* (2013.01); *G06N 20/20* (2019.01); *G10L 15/02* (2013.01)

(58) Field of Classification Search
CPC ....... G10L 25/60; G10L 15/02; G10L 13/027; G10L 17/00; G10L 17/06; G10L 17/18; G06N 20/20; G06F 3/167; H04R 1/08
See application file for complete search history.

(56) References Cited

U.S. PATENT DOCUMENTS 9,824,692 B1   11/2017   Khoury et al.
10,141,009 B2   11/2018   Khoury et al.
(Continued)

FOREIGN PATENT DOCUMENTS

WO    WO-2019/145708 A1    8/2019

OTHER PUBLICATIONS

"Robustness of Quality-based Score Calibration of Speaker Recognition Systems with respect to low-SNR and short-duration conditions", Biometrics and Internet Security Research Group, Hochschule Darmstadt, Germany, Odyssey 2016, pp. 358-365, Jun. 2016 (Year: 2016).*

(Continued)

*Primary Examiner* — Richemond Dorvil
*Assistant Examiner* — Nadira Sultana
(74) *Attorney, Agent, or Firm* — Foley & Lardner LLP

(57) ABSTRACT

Embodiments described herein provide for a machine-learning architecture for modeling quality measures for enrollment signals. Modeling these enrollment signals enables the machine-learning architecture to identify deviations from expected or ideal enrollment signal in future test phase calls. These differences can be used to generate quality measures for the various audio descriptors or characteristics of audio signals. The quality measures can then be fused at the score-level with the speaker recognition's embedding comparisons for verifying the speaker. Fusing the quality measures with the similarity scoring essentially calibrates the speaker recognition's outputs based on the realities of what is actually expected for the enrolled caller and what was actually observed for the current inbound caller.

17 Claims, 3 Drawing Sheets

(56) References Cited

U.S. PATENT DOCUMENTS

| | | | |
|---|---|---|---|
| 10,403,291 B2 * | 9/2019 | Moreno | G10L 17/14 |
| 10,692,502 B2 | 6/2020 | Khoury et al. | |
| 10,923,111 B1 * | 2/2021 | Fan | G10L 15/16 |
| 11,095,572 B1 | 8/2021 | Stafford et al. | |
| 11,238,843 B2 * | 2/2022 | Arik | G10L 13/08 |
| 11,322,157 B2 * | 5/2022 | Vaquero | G10L 17/04 |
| 11,437,027 B1 * | 9/2022 | Guo | G06F 40/30 |
| 2014/0379332 A1 | 12/2014 | Rodriguez et al. | |
| 2015/0301796 A1 | 10/2015 | Visser et al. | |
| 2015/0356974 A1 * | 12/2015 | Tani | G10L 17/06 |
| | | | 704/239 |
| 2018/0293221 A1 * | 10/2018 | Finkelstein | G06N 20/00 |
| 2019/0333522 A1 * | 10/2019 | Lesso | G10L 17/06 |
| 2020/0184967 A1 * | 6/2020 | Gupta | B60K 35/00 |
| 2020/0312313 A1 * | 10/2020 | Maddali | G06N 20/00 |
| 2020/0312337 A1 * | 10/2020 | Stafylakis | G10L 17/00 |
| 2020/0322377 A1 * | 10/2020 | Lakhdhar | G06F 17/18 |
| 2021/0233541 A1 | 7/2021 | Chen et al. | |
| 2021/0241776 A1 | 8/2021 | Sivaraman et al. | |
| 2021/0280171 A1 | 9/2021 | Phatak et al. | |
| 2022/0030345 A1 * | 1/2022 | Gong | G06F 21/84 |

OTHER PUBLICATIONS

"Quality_Measure_Functions_for_Calibration_of_Speaker_Recognition_Systems_in_Various_Duration_Conditions", IEEE Transactions on Audio, Speech, and Language Processing, vol. 21, No. 11, Nov. 2013 (Year: 2013).*

International Search Report and Written Opinion for PCT/US2021/046901 dated Dec. 6, 2021 (13 pages).

International Preliminary Report on Patentability for PCT App. PCT/US2021/046901 dated Feb. 16, 2023 (11 pages).

* cited by examiner

SPEAKER RECOGNITION WITH QUALITY INDICATORS

CROSS-REFERENCE TO RELATED APPLICATIONS

This application claims priority to U.S. Provisional Application No. 63/068,685, filed Aug. 21, 2020, which is incorporated by reference in its entirety.

This application generally relates to U.S. Pat. No. 9,824,692, entitled "End-To-End Speaker Recognition Using Deep Neural Network," filed Sep. 12, 2016, which is incorporated by reference herein in its entirety.

This application generally relates to U.S. Pat. No. 10,692,502, entitled "Method and Apparatus for Detecting Spoofing Conditions," filed Mar. 2, 2018, which is incorporated by reference herein in its entirety.

This application generally relates to U.S. application Ser. No. 17/155,851, entitled "Robust Spoofing Detection System Using Deep Residual Neural Networks," filed Jan. 22, 2021, which is incorporated by reference herein in its entirety.

This application generally relates to U.S. application Ser. No. 17/192,464, entitled "Systems and Methods of Speaker-Independent Embedding for Identification and Verification from Audio," filed Mar. 4, 2021, which is incorporated by reference herein in its entirety.

This application generally relates to U.S. application Ser. No. 17/165,180, entitled "Cross-Channel Enrollment and Authentication of Voice Biometrics," filed Feb. 2, 2021, which is incorporated by reference herein in its entirety.

This application generally relates to U.S. Pat. No. 10,141,009, entitled "System and Method for Cluster-Based Audio Event Detection," filed May 31, 2017, which is incorporated by reference herein in its entirety.

This application generally relates to U.S. application Ser. No. 16/775,146, entitled "Unsupervised Keyword Spotting and Word Discovery for Fraud Analytics," filed Jan. 28, 2020, which is incorporated by reference herein in its entirety.

TECHNICAL FIELD

This application generally relates to systems and methods for managing, training, and deploying a machine learning (ML) architecture for audio processing. In particular, this application relates to deploying a speaker detection fraud detection engine that operates relative to tailored fraud importance for the various types of fraud events.

BACKGROUND

Enterprise call centers may be protected against fraudulent activities through machine-learning (ML) software that detects various types of fraud. Automatic Speech Recognition (ASR) and Automatic Speaker Verification (ASV) systems may be used for security and authentication features, as well as other voice-based operations. Speaker-independent features of call data may be used to evaluate, for example, the types of devices, the communications channels, the geographic location, and the like. Similarly, call centers may employ fraud detection functions evaluating various forms of communications channels, including Internet of Things (IoT) devices for communications via computing networks or telephone calls of various forms, such as landline telephone calls, cellular telephone calls, and Voice-over-IP (VoIP) calls, among others. Fraud detection operations can employ cross-channel fraud risk assessments using data acquired from various different channels.

Speaker recognition systems are becoming ubiquitous in the day-to-day activities of people with applications ranging from enterprise solutions in the contact center to personalized IoT devices. The performance of speaker recognition is highly dependent on the quality (e.g., noisiness and duration) of data that is available for training and validation of machine learning models. Prior approaches implemented data augmentation to build more robust machine-learning architecture models, but these approaches can still fail to generalize well to conditions with noise and duration of speech variability especially in the case of text-dependent speaker recognition. What is needed is way to improve on prior speaker recognition systems to be able to perform well with enrollment and testing data collected in adverse and unrestricted conditions.

SUMMARY

Disclosed herein are systems and methods capable of addressing the above-described shortcomings and may also provide any number of additional or alternative benefits and advantages. Embodiments described herein provide for a machine-learning architecture for modeling quality measures for enrollment signals. Modeling these enrollment signals enables the machine-learning architecture to identify deviations from expected or ideal enrollment signal in future test phase calls. These differences can be used to generate quality measures for the various audio descriptors or characteristics of audio signals. The quality measures can then be fused at the score-level with the speaker recognition's embedding comparisons for verifying the speaker. Fusing the quality measures with the similarity scoring essentially calibrates the speaker recognition's outputs based on the realities of what is actually expected for the enrolled caller and what was actually observed for the current inbound caller.

In an embodiment, a computer-implemented method comprises extracting from an inbound audio signal for an inbound speaker, by a computer, one or more acoustic features; generating, by the computer, one or more quality measures and an overall quality measure for the inbound audio signal, by applying a first machine-learning architecture to the one or more acoustic features; extracting, by the computer, an inbound speaker embedding for an inbound speaker from the one or more acoustic features for the inbound audio signal, by applying a second machine-learning architecture to the one or more acoustic features of the inbound audio signal; generating, by the computer, a first similarity score for the inbound speaker based upon the inbound embedding and an enrolled voiceprint for a enrolled speaker, by applying the second machine-learning architecture; and generating, by the computer, a second similarity score for verifying the inbound speaker, the second similarity score generated based upon the one or more quality measures and the first similarity score.

In another embodiment, a system comprises a database configured store an enrolled voiceprint for an enrolled speaker; and a server comprising a processor configured to: extract from an inbound audio signal for an inbound speaker one or more acoustic features; generate one or more quality measures and an overall quality measure for the inbound audio signal, by applying a first machine-learning architecture to the one or more acoustic features; extract an inbound speaker embedding for an inbound speaker from the one or applying a second machine-learning architecture to the one or more acoustic features of the inbound audio signal; generate a first similarity score for the inbound speaker based upon the inbound embedding and an enrolled voiceprint for a enrolled speaker, by applying the second machine-learning architecture; and generate a second similarity score for verifying the inbound speaker, the second similarity score generated based upon the one or more quality measures and the first similarity score.

In another embodiment, a computer-readable medium comprises a non-transitory storage memory configured to store machine-readable instructions that when executed by a processor instruct the processor to: extract from an inbound audio signal for an inbound speaker one or more acoustic features; generate one or more quality measures and an overall quality measure for the inbound audio signal, by applying a first machine-learning architecture to the one or more acoustic features; extract an inbound speaker embedding for an inbound speaker from the one or more acoustic features for the inbound audio signal, by applying a second machine-learning architecture to the one or more acoustic features of the inbound audio signal; generate a first similarity score for the inbound speaker based upon the inbound embedding and an enrolled voiceprint for a enrolled speaker, by applying the second machine-learning architecture; and generate a second similarity score for verifying the inbound speaker, the second similarity score generated based upon the one or more quality measures and the first similarity score.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
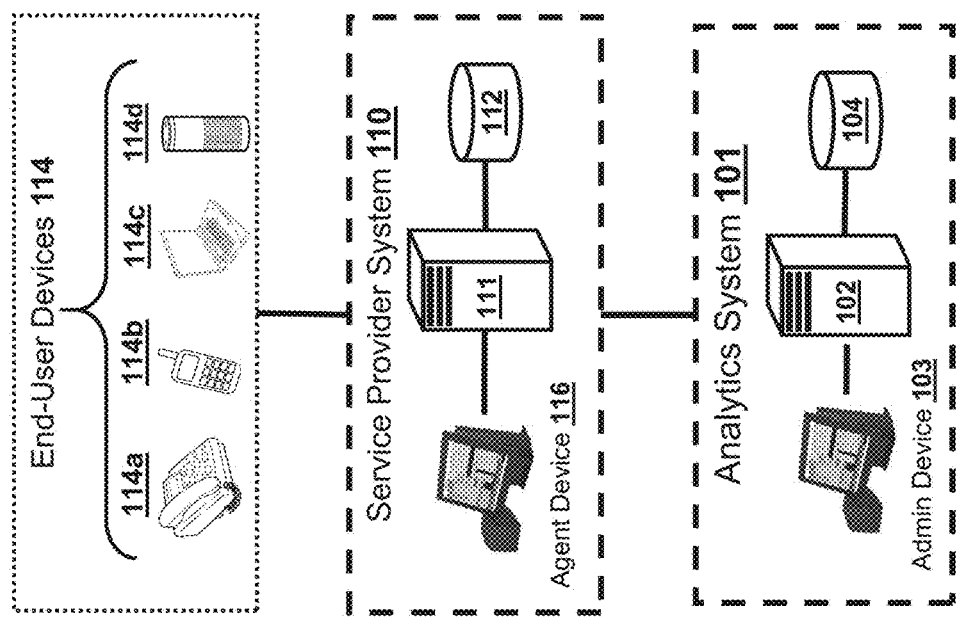
FIG. 1A shows components for a system for receiving and analyzing telephone calls.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing various types of data associated with inbound calls, including protocol metadata, caller inputs, and audio signals to determine a risk of fraud (or similarity score) associated with calls or data traffic directed to an enterprise's customer contact channel (e.g., call center, website). The system receives calls or data traffic through any number of channels, such as typical telephony networks or data communications networks (e.g., Internet, private intranet). Computing devices of the enterprise's call center capture, store, and forward the call data (e.g., audio data, metadata) to a server that performs various analytics operations on the call data.

Embodiments described herein include one or more computing devices that execute a machine-learning architecture, including a first machine-learning architecture and a second machine-learning architecture, though embodiments may include a single machine-learning architecture configured to function as these two machine-learning architectures. Embodiments, however, may include a plurality of distinct machine-learning architectures executed by the one or more computing devices configured to perform the functions described herein. The machine-learning architectures may include any number and combination of machine-learning techniques or types of machine-learning structures, such as neural network architectures and Gaussian Mixture Models (GMMs), among others. For ease of description, the operations of a particular machine-learning architecture are described as "layers," though the machine-learning architecture need not be a neural network architecture.

Figure 1B:
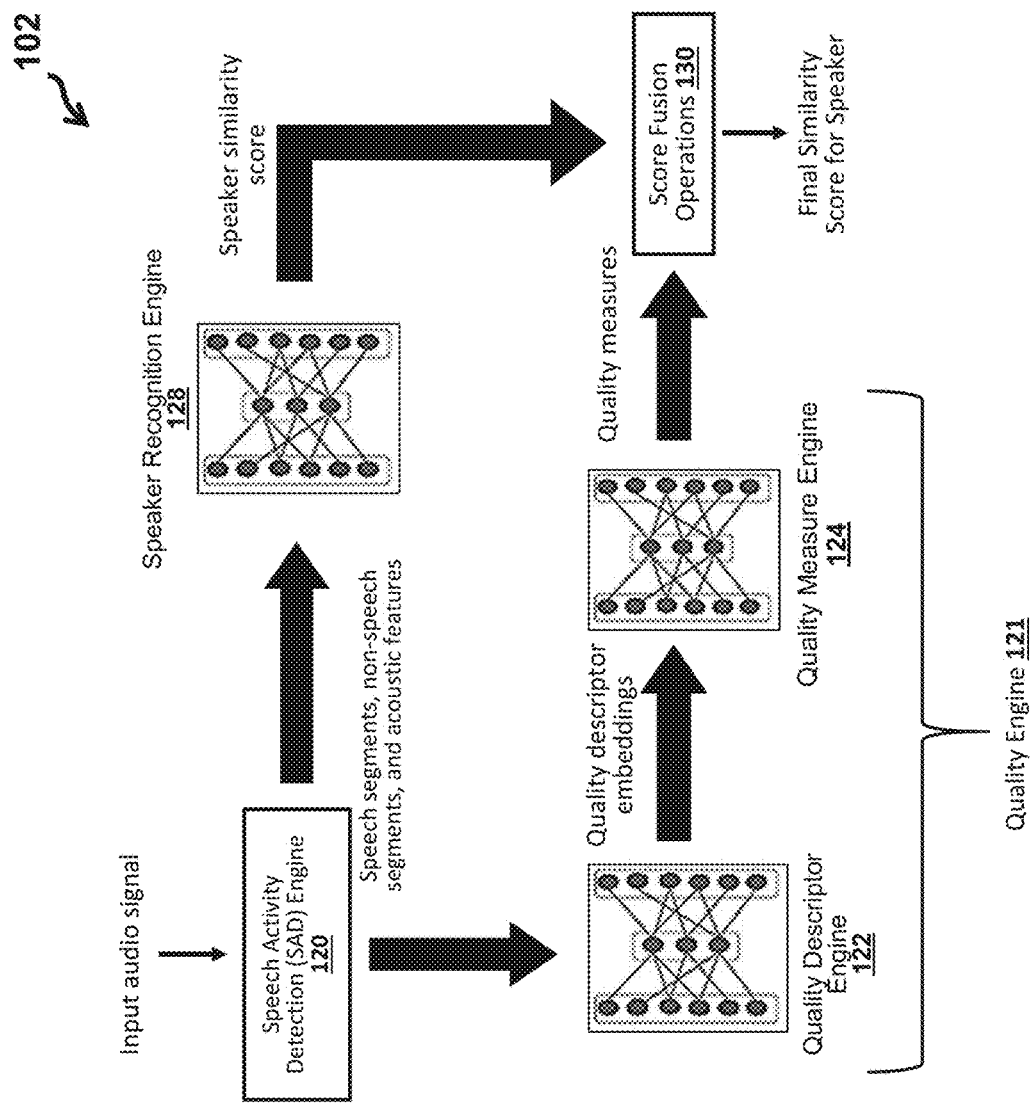
FIG. 1B shows data flow between layers of a machine-learning architecture and other operations executed by an analytics server of the system.

FIG. 1A shows components for a system 100 for receiving and analyzing telephone calls. FIG. 1B shows data flow between layers of a machine-learning architecture and other operations executed by an analytics server 102 of the system 100.

FIG. 1A shows the components of the system 100. The system 100 comprises a call analytics system 101, call center systems 110 of customer enterprises (e.g., companies, government entities, universities), and caller devices 114. The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1A and FIG. 1B, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1A shows the analytics server 102 as a distinct computing device from the analytics database 104. In some embodiments, the analytics database 104 is integrated into the analytics server 102.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., provider systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networks, and exchanges, among others.

The caller devices 114 (sometimes referred to as "end-user devices") may be any communications or computing device that the caller operates to access the services of the call center system 110 through the various communications channels. For instance, the end-user may place the call to the call center system 110 through a telephony network or through a software application executed by the caller device 114. Non-limiting examples of caller devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The caller devices 114, however, are not limited to the telecommunications-oriented devices or channels. For instance, in some cases, the mobile phones 114b may communicate via a computing network channel (e.g., the Internet). The caller device 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for computing network communications. The edge device 114d could be any smart device capable of executing software applications and/or performing voice interface operations. Non-limiting examples of the edge device 114d may include voice assistant devices, automobiles, smart appliances, and the like.

An analytics service operates the analytics system 102 to perform various call analytics operations on behalf of the enterprise's call center system 110. The analytics operations include, for example, fraud detection and caller authentication. An end user-facing enterprise organization (e.g., corporation, government entity, university) operates the call center system 110 to service calls or web-based interactions with the end users via the various communication channels. The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1A shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes data analysis and audio-processing software that includes machine-learning (or artificial intelligence) software routines for an automatic speaker verification (ASV), where the software routines define a machine-learning architecture and models, such as a Gaussian Mixture Matrix (GMM), neural network (e.g., convolutional neural network, deep neural network), and the like. The machine-learning architecture comprises functions or layers that define, for example, a quality descriptor engine 122 and a quality measure engine 124 (collectively, a quality engine 121), a speech activity detection (SAD) engine (SAD engine 120) that performs the operations of SAD (sometimes referred to as "voice activity detection" (VAD)), a fraud detection engine (e.g., speaker recognition engine 128), among other operations (e.g., pre-processing audio signals). As mentioned, the analytics server 102 may execute any number of machine-learning architectures having any number of layers, though for ease of description the analytics server 102 in FIGS. 1A-1B executes a single machine-learning architecture for the ASV comprising the speaker recognition engine 128, quality descriptor engine 122, and the quality measure engine 124 as subcomponents or sub-architectures.

The machine-learning architecture operates logically in several operational phases, including a training phase, an enrollment phase, and a deployment phase (sometimes referred to as a "test phase" or "testing"), though some embodiments need not perform the enrollment phase for developing certain components of the machine-learning architecture. The analytics server 102 receives input audio signals corresponding to the particular operational phase of the machine-learning architecture, include training audio signals during the training phase, enrollment audio signals during the enrollment phase, and inbound audio signals during the deployment phase. The analytics server 102 applies certain layers of the machine-learning architecture to each type of input audio signal during the corresponding operational phase.

During a training phase, the analytics server 102 receives training audio signals or generates various simulated training audio signals, which may include degraded copies of training audio signals. The analytics server 102 applies the layers of the various machine-learning architectures to generate predicted output according to the operational layers of the particular component of the machine-learning architecture. Loss layers or another aspect of the machine-learning architectures determine a level of error (e.g., one or more similarities, distances) between the predicted output and labels or other data indicating the expected output. The loss layers or another aspect of the machine-learning architecture adjusts the hyper-parameters until the level of error for the predicted outputs satisfy a threshold level or error with respect to expected outputs. The analytics server 102 then stores the hyper-parameters, weights, or other terms of the particular machine-learning architecture, thereby "fixing" the particular component of the machine-learning architecture and one or more models.

During an enrollment phase, an enrollee-speaker, such as an end-consumer of the call center system 110, provides (to the call analytics system 101) bonafide enrollee audio signals (sometimes referred to as "enrollment audio signals") containing noise. For instance, the enrollee could respond to various interactive voice response (IVR) prompts generated by IVR software executed by the call center server 111 via the telephone channel. As another example, the enrollee could respond to various prompts generated by the call center server 111 and exchanged with a software application (e.g., Skype®) of the edge device 114d via the corresponding communications channel. The call center server 111 then forwards these recorded responses to the analytics server 102 as the enrollment audio signals for the enrollee. The analytics server 102 may also generate degraded or noisy copies of the enrollee audio signals to develop the layers of the quality engine 121 (e.g., quality descriptor engine 122, quality measure engine 124). The analytics server 102 applies the various components of the machine-learning architecture to develop models representing the enrollee. For example, the speaker recognition engine 128 extracts and algorithmically combines one or more enrollee embeddings to generate an enrollee voiceprint. As another example, to develop the quality engine 121 for the enrollee, the analytics server 102 applies the quality measure engine 124 on degraded versions of the enrollment audio signals, to develop the quality measure engine 124 to determine a distance between a degraded version and the clean sample's speaker embeddings/voiceprints. This distance represents a quality measure for a particular acoustic audio descriptor.

During the deployment phase, the analytics server 102 receives the inbound audio signal from an inbound caller. The analytics server 102 applies the various components of the machine-learning architectures to extract an inbound embedding (or inbound voiceprint) for the inbound caller and determine whether the inbound voiceprint is within a verification threshold of the previously generated enrollee voiceprint based on a similarity score (sometimes called a "risk"). In parallel, the quality engine 121 generates audio quality measures for the inbound audio call using the models developed for the enrollee in the quality descriptor engine 122 and quality measure engine 124. The quality engine 121 generates an overall or total quality measure by algorithmically combining the quality measures. The score fusion operation 130 generates a fusion (or calibration) the initial similarity score with the quality measures by algorithmically combining the initial similarity score with the total quality measure to generate a final similarity score. The analytics server 102 then verifies whether the caller is an enrollee if the final similarity score satisfies a similarity threshold.

The machine-learning architecture, or sub-architectures of the machine-learning architecture (e.g., quality engine 121, speaker recognition engine 128), comprises operational layers or calculation layers and classification layers, among others. The operational layers perform various operations or calculations for extracting the embedding from the input audio signal, including layers such as convolutional layers, statistics layers, and pooling layers, among others. The classification layers evaluate the embedding from the input audio signal to determine the one or more types or classifications. The classification layers include, for example, fully-connected layers, feed-forward layers, and the like. In some cases, the machine-learning architecture further includes loss layers that perform loss functions for evaluating a level of error, and adjusts or tunes hyper-parameters of the machine-learning architecture. The level of error represents the distance between a predicted output (e.g., predicted embedding, predicted classification) and an expected output (e.g., expected embedding, expected classification).

In some implementations, the analytics server 102 disables or engages certain layers of the machine-learning architecture according to the particular operational phase. For example, the analytics server 102 engages the classification layers and loss layers during the training phase and disables the classification layers and loss layers during the deployment phase.

Certain layers can perform various pre-processing operations or data augmentation operations on the input audio signals for certain operational phases. In some implementations, the analytics server 102 performs the pre-processing or data augmentation operations on the input audio signal before executing and applying the machine-learning architecture on the input audio signal. Additionally or alternatively, the machine-learning architecture comprises layers instructing the analytics server 102 to perform the pre-processing or data augmentation operations. Non-limiting examples of the pre-processing operations on inputted audio signals include parsing or segmenting the input audio signal into frames or segments, performing one or more transformation functions (e.g., FFT, SFT), and extracting various types of features from the input audio signal, among other potential pre-processing operations. Non-limiting examples of such data augmentation operations include duration augmentation (e.g., duration clipping), among others.

The machine-learning architecture executes a GMM-based SAD engine 120 that, when applied to an input audio signal, identifies speech portions and non-speech portions of the input audio signal. The SAD engine 120 then filters-out or parses the non-speech portions from the input audio signal. The analytics server 102 trains the SAD engine 120 to include a speech GMM for detecting speech instances and a non-speech GMM for detecting non-speech instances in the input audio signal.

The quality engine 121 includes the quality descriptor engine 122 and quality measure engine 124 that ingest and perform various processes on the call data to generate one or more quality measures (e.g., acoustic quality measures, duration quality measures) for one or more corresponding quality descriptors (e.g., audio quality, duration of speech) for the call audio of the input audio signal. The quality descriptor engine 122 includes various convolutional, statistical, pooling, fully-connected, and classifier layers that extract a quality measure embedding from the acoustic features extracted from the audio signals. The classifier layers then determine a likely classification for the embedding relative to a type of audio descriptor. For example, the quality descriptor engine 122 may comprise a codec classifier and an audio event classifier. In this example, the quality descriptor engine 122 extracts quality measure embeddings from the features of the input audio signal. Using the corresponding quality measure embeddings (e.g., codec embedding, audio event embedding, microphone type, device type, network type), the codec classifier determines the codec used for transmitting the input audio signal and the audio event classifier determines one or more audio events occurring in the input audio signal. Additional or alternative classifiers may include classifiers for microphone type, device type, and network type.

During enrollment and deployment phases, the quality descriptor engine 122 extracts the quality measure embeddings, while the classifications are optional. In some implementations, the analytics server 102 disable the classifiers, such that the quality descriptor engine 122 extracts the embeddings but does not perform the classification operation, though outputting the classifications may be beneficial in some circumstances. The one or more classifiers learn to model, for example, noisy conditions, audio events (e.g., speech, appliance, car), codecs, or other potential audio descriptors.

The quality measure engine 124 includes layers forming a feedforward network that ingests the quality measure embeddings and generates corresponding quality measures. The analytics server 102 trains the feedforward network to include models for generating a quality measure for each of the quality descriptors of interest (e.g., codec, audio event). In the system 100, for example, the quality measure engine 124 generates a codec quality measure and an audio event quality measure.

The speaker recognition engine 128 (or any other fraud detection engine) ingests the audio features of the input audio signal and applies various layers for extracting a speaker embedding, sometimes referred to as a "voiceprint," as a vector modeling speaker attributes. During training, classifier layers are applied to predict a speaker. But as with the quality descriptor engine 122, the classifier layers may be disabled during enrollment and deployment, after the quality descriptor engine 122 is trained. The speaker recognition engine 128 then generates the similarity score or risk score indicating a relative distance between the speaker embedding and an expected voiceprint (e.g., enrollee voiceprint) stored in memory. The output of the speaker recognition engine 128 is the similarity score representing the relative distances or similarity between the speaker embedding and the enrollee voiceprint. The speaker recognition engine 128 may determine the speaker a registered user associated with the enrollee voiceprint when the similarity score satisfies a threshold.

The details of fraud detection engines, such as the speaker recognition engine 128, need not be explored in detail here. Example embodiments of the speaker recognition engine 128 and other fraud detection engines may be found in Example embodiments of the fraud detection engine and the machine-learning software and functions are described in U.S. application Ser. No. 15/262,748, entitled "End-To-End Speaker Recognition Using Deep Neural Network;" U.S. application Ser. No. 15/910,387, entitled "Method and Apparatus for Detecting Spoofing Conditions;" U.S. application Ser. No. 17/155,851, entitled "Robust Spoofing Detection System Using Deep Residual Neural Networks;" U.S. application Ser. No. 17/192,464, entitled "Systems and Methods of Speaker-Independent Embedding for Identification and Verification from Audio;" and U.S. application Ser. No. 17/165,180, entitled "Cross-Channel Enrollment and Authentication of Voice Biometrics," each of which has been incorporated by reference in its entirety.

The score fusion operation 130 "calibrates" the results of the speaker recognition engine 128 based on the quality measures (e.g., duration of speech, codec, audio event). The score fusion operation 130 algorithmically combines the similarity score with the quality measures and one or more optional preconfigured weights and parameters. The score fusion operation 130 outputs the ultimate or final similarity score or risk score.

As mentioned, certain layers can perform various pre-processing operations on the input audio signals. Non-limiting examples of the pre-processing operations on inputted audio signals include parsing or segmenting the input audio signal into frames or segments, performing one or more transformation functions (e.g., FFT, SFT), and extracting various types of features from the input audio signal, among other potential pre-processing operations. In some implementations, the analytics server 102 performs the pre-processing or data augmentation operations on the input audio signal before executing and applying the machine-learning architecture on the input audio signal. Additionally or alternatively, the machine-learning architecture comprises layers instructing the analytics server 102 to perform the pre-processing or data augmentation operations.

Additionally or alternatively, certain layers of the quality engine 121 or speaker recognition engine 128 can perform various data augmentation operations on the input audio signals during the training phase to obtain training audio signals. For example, when training certain layers of the quality descriptor engine 122 defining a codec classifier, the analytics server 102 can perform certain data augmentation operations on the training audio signals to force the quality engine 121 to evaluate and adjust for various types of codecs. As another example, for training certain layers of the SAD engine 120 and quality measure engine 124 for determining the duration quality measure, the analytics server 102 can perform a duration augmentation (e.g., duration clipping) operation before applying the SAD engine 120 train robust speech GMMs, as well as training robust models in the various machine-learning architectures downstream from the SAD engine 120.

The analytics server 102 applies the components of the quality engine 121 on a set of enrollee-speaker audio signals (sometimes referred to as "enrollment audio signals") in one or more optional enrollment phases. The analytics server 102 may perform an enrollment phase to develop particular quality measure models for the enrollee or certain types of audio descriptors.

The analytics server 102 applies the now-trained machine-learning architecture on each of the enrollee audio samples and generates corresponding enrollee embeddings.

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS). The analytics database 104 and/or the call center database 112 contains any number of corpora of training call data (e.g., training audio signals, training metadata) that are accessible to the analytics server 102 via the one or more networks. In some embodiments, the analytics server 102 employs supervised training to train the models of the machine-learning architecture, where the analytics database 104 and/or the call center database 112 contains labels associated with the training call data or enrollment call data. The labels indicate, for example, the expected data for the training call data or enrollment call data. The analytics server 102 may also query an external database (not shown) to access a third-party corpus of training call data. An administrator may configure the analytics server 102 to select the training call data having various types of characteristics or metadata. The analytics database 104 stores the configuration inputs received from the agent device 116 that configure operational parameters of the fraud importance engine, as well as trained models, caller enrollment and registration information, and other types of information managing the functions of the analytics server 102.

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of call data (e.g., audio data, audio recording, metadata, speaker inputs) about the call, the caller, and/or the caller device 114 and forward the call data to the agent device 116, where an agent UI of the agent device 116 displays the call data to the call center agent.

The call center server 111 also transmits the call data to the analytics system 101 to perform the various analytics processes on the call data of the inbound call or any prior call. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

The admin device 103 of the analytics system 101 is a computing device allowing personnel of the analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 or provider system 110 and to issue queries and instructions to such components. In the example system 100, the agent device 116 configures the operations of the fraud importance engine and provides fraud detection feedback, though in some implementations, the admin device 103 performs one or more of these functions.

The agent device 116 of the call center system 110 may allow agents or other users of the call center system 110 to configure operations of devices of the call center system 110. For calls made to the call center system 110, the agent device 116 receives and displays via the agent UI some or all of the information associated with inbound call data, routed from the call center server 111 or from the analytics server 102. The agent UI further permits the agent to provide fraud detection feedback from the machine-learning architecture to the analytics server and configure the operations of the fraud importance engine by selecting or customizing the attributes for determining the fraud importance scores.

When performing a fraud detection operation, the agent UI presents the agent a list of fraud determinations for current or prior calls. The agent inputs whether the particular call involved fraud, which sometimes contradict and correct a previous determination made by the fraud detection engine. In some embodiments, the analytics server 102 uses this feedback for retraining or tuning the models of the fraud detection engine, but also for tuning the fraud importance engine. For example, the feedback may disrupt the false negative and true positive ratios. The agent might accept the updated ratios or adjust the weight assigned to the false negative attribute field, thereby tuning the sensitivity of the fraud detection engine. The fraud importance engine could be adjusted to decrease the number of false negatives (overlooked instances of fraud), thereby generally increasing the fraud importance scores assigned to the call data, making it more likely that the fraud risk scores generated by the models of the fraud detection engine will satisfy the fraud detection thresholds.

FIG. 1B shows data flow of the analytics server 102 executing functions of the machine-learning architecture for speaker recognition. For ease of description, the machine-learning architecture comprises a single collection of functional layers. Some embodiments, however, may include any number of distinct machine-learning architectures having disparate collections of layers executed by any number of computing devices. The layers of the machine-learning architecture perform functions that define certain operations, where the layers define the SAD engine 120, a quality descriptor engine 122, a quality measure engine 124, a speaker recognition engine 128, and score fusion operations 130.

The analytics server 102 may perform certain pre-processing operations on input audio signals, such as performing SAD (e.g., SAD engine 120), parsing or generating speech portions and non-speech portions, extracting acoustic features (e.g., Mel-Frequency Cepstral Coefficients (MFCCs)), performing a transformation, or the like. The analytics server 102 may also execute the data augmentation operations to obtain additional training audio signals by generating simulated audio signals used for training the quality measure engine 124.

The SAD engine 120 identifies segments or frames of the input audio signal containing speech (referred to as "speech portions") and segments or frames of the input audio signal that do not contain speech (referred to as "non-speech portions"). In some embodiments, the SAD engine 120 represents a pre-processing operation for the machine-learning architecture. This disclosure need not detail the functions and operations of SAD software programs and developing speech GMMs and non-speech GMMs. Example embodiments of the SAD engine 120 and training GMMs are described in U.S. Pat. No. 10,141,009, entitled "System and Method for Cluster-Based Audio Event Detection," filed May 31, 2017; and U.S. application Ser. No. 16/775,146, entitled "Unsupervised Keyword Spotting and Word Discovery for Fraud Analytics," filed Jan. 28, 2020, each of which is incorporated by reference in its entirety.

Generally, the SAD engine 120 identifies whether a portion of the audio signal contains speech by applying a clustering algorithm on the features extracted from the speech portions and non-speech portions of the inbound audio signal. The SAD engine 204 clusters the portions into clusters having of similar features that satisfy a clustering threshold, and then extracts a vector, or Gaussian mixture model (GMM), using the values of the clustered features. During training, the SAD engine 120 extracts a trained GMM for speech portions (speech GMM) and a trained GMM for non-speech portions (non-speech GMM), where labels indicate whether the portions of the training signals contain speech. During later enrollment or testing phases, the SAD engine 120 applies the GMMs against the vectors or GMMs extracted from the clusters produced from the particular input audio signal (e.g., enrollment signal, inbound signal) to determine the relative distances or similarities.

Improving upon prior approaches to SAD software, embodiments of the SAD engine 120 disclosed herein may identify and generate a quality measure for an audio signal representing the duration of speech in the speech portions. The SAD engine 120 extracts the quality measure for the duration of speech based upon model selection (speech GMM, non-speech GMM), whereby the SAD engine 120 computes, for example, an amount of speech associated with the speech portions or computes a relative ratio (e.g., log likelihood ratio) of the respective likelihood or similarity scores of the speech GMM and the non-speech GMM.

In operation, the analytics server 102 applies the SAD engine 120 on the input audio signal to parse or filter the non-speech portions away from the speech portions, thereby generating audio data representing the speech portions and, in some cases, the non-speech portions. In some implementations, the SAD engine 120 further extracts the quality measure for the duration of speech. Using the speech segments generated by the SAD engine 120, the analytics server 102 extracts acoustic features (e.g., MFCCs) from the speech portions of input audio signal, performs a transform operation (e.g., FFT, SFT), and feeds the acoustic features into the quality descriptor engine 122.

The quality engine 121, including the quality descriptor engine 122 and quality measure engine 124, extracts vectors, or embeddings, according to the particular type of audio signal descriptors represented by the quality measures. The layers of the quality descriptor engine 122 comprise any number of layers defining one or more classifiers for one or more types of signal descriptors, such as the codec classifier or audio event classifier. The layers of the quality measure engine 124 include, for example, various convolutional layers, pooling layers, normalization layers, statistics layers, fully connected layers, a feedforward network, and loss layers, among others. In operation, the quality descriptor engine 122 uses the features of a particular input audio signal to extract the embedding for the input audio signal and, applying the layers of the one or more classifiers, determines one or more classifications for the various quality descriptors. For example, the quality descriptor engine 122 ingests an input audio signal, extracts a set of acoustic features, and extracts an embedding using the one or more features. Based upon this embedding, the quality descriptor engine 122 then determines or classifies the codec used for transmitting the input audio signal and one or more audio events present in the audio.

During training, the classifier layers of the quality descriptor engine 122 generate a predicted output (e.g., predicted embedding, predicted classification). The loss layers may determine a level error by determining a relative similarity between the predicted output and expected outputs (e.g., expected embedding, expected classification) as indicated by training labels or otherwise stored in memory accessible to the loss layers. The loss layers may adjust the hyper-parameters and continue performing training operations until the relative similarity for the training phase satisfies a training threshold. Once trained, the quality descriptor engine 122 extracts embeddings for input audio signals representing the particular audio descriptors that correspond to the quality measures. Those quality embeddings represent the audio quality descriptors used to train the quality measure engine 124.

The analytics server 102 feeds the embeddings into the quality measure engine 124, which may be a component feedforward network of the quality descriptor engine 122 or distinct from the quality descriptor engine 122. Using the quality embeddings extracted by the quality descriptor engine 122, the quality measure engine 124 determines the respective quality measures, representing the relative distance (e.g., cosine similarity) between a quality embedding extracted for a clean audio signal and a quality embedding extracted for corresponding degraded or noisy audio signals. The quality measure engine 124 outputs one or more quality measures for the one or more corresponding quality descriptors.

The analytics server 102 trains models for the quality measure engine 124 using the embeddings extracted from clean and noisy (or otherwise degraded) training audio signals. The analytics server 102 trains the models for the quality measure engine 124 corresponding to the quality descriptors (e.g., audio event, codec). During the training or enrollment phases, the analytics server 102 trains or develops the models of the quality measure engine 124 by applying the quality measure engine 124 on quality embeddings extracted from clean versions of a particular audio samples (e.g., clean training audio signal, clean enrollment audio signal) and corresponding quality embeddings for the noisy versions of the audio samples (e.g., degraded training audio signal, simulated audio signal, degraded enrollment audio signal). Each model of the quality measure engine 124 outputs the cosine similarity between a speaker's clean speaker embedding and the related noisy speaker embedding. The layers of the quality measure engine 124 reduce the dimensions of the quality embeddings to a one-dimensional value for the quality measure. This quality measure metric serves as a measure of how close an audio signal is to a clean version of itself, given the duration of speech and the noisy conditions present in input audio signal. The analytics server 102 feeds these quality measures for the acoustic quality descriptors into the score fusion operation 130.

For the speech duration, the analytics server 102 separately determines the duration quality measure corresponding to the duration quality descriptor. The analytics server 102 determines the duration of speech in the speech segments. During training, the analytics server 102 applies the SAD engine 120 against training signals have various different lengths. The analytics server 102 may also employ data augmentation operations to generate training audio signals that manipulate the duration of speech, instances of speech, and degrade the audio signals in various ways, thereby training speech GMMs and non-speech GMMs for the SAD engine 120. To determine duration of speech, the analytics server 102 computes the cosine similarity between a speaker's clean audio signal and a corresponding noisy sample, which typically have a logarithmic relationship with duration of speech. In some cases, an administrative user may preconfigure the analytics server 102 to implement one or more weights or parameters when calculating the duration quality measure using the logarithm of the duration of speech in the clean and noisy speech segments.

The analytics server 102 then calculates a total quality measure scores using the various audio quality measures generated by the quality measure engine 124. After the analytics server 102 successfully trains the SAD engine 120, quality descriptor engine 122, and quality measure engine 124, the analytics server 102 then uses the total quality measure and/or the one or more quality measures to perform score fusion operations following the speaker recognition engine 128, which may be a form of a fraud detection engine. The analytics server 102 performs the fusion operations 130 to control for or calibrate the similarity score generated by the quality measure engine 128 based on the quality of an enrollment and/or test input score, during an enrollment or deployment phase.

The quality measure engine 128 outputs a similarity score based upon the relative distances or similarity between a test voiceprint embedding and an enrolled voiceprint embedding. To fuse the scores, the analytics server 102 algorithmically combines the total quality measure or the several quality measures with the test voiceprint generated by the speaker recognition engine 128. The score fusion operation 130 outputs a final similarity score. The analytics server 102 may determine whether this final similarity score satisfies a recognition or risk threshold. If the final similarity score satisfies the threshold, then the caller is verified against the enrolled voiceprint. The analytics server 102 may perform any number of alternative operations if the caller fails verification because the final similarity score fails to satisfy the threshold.

Figure 2:
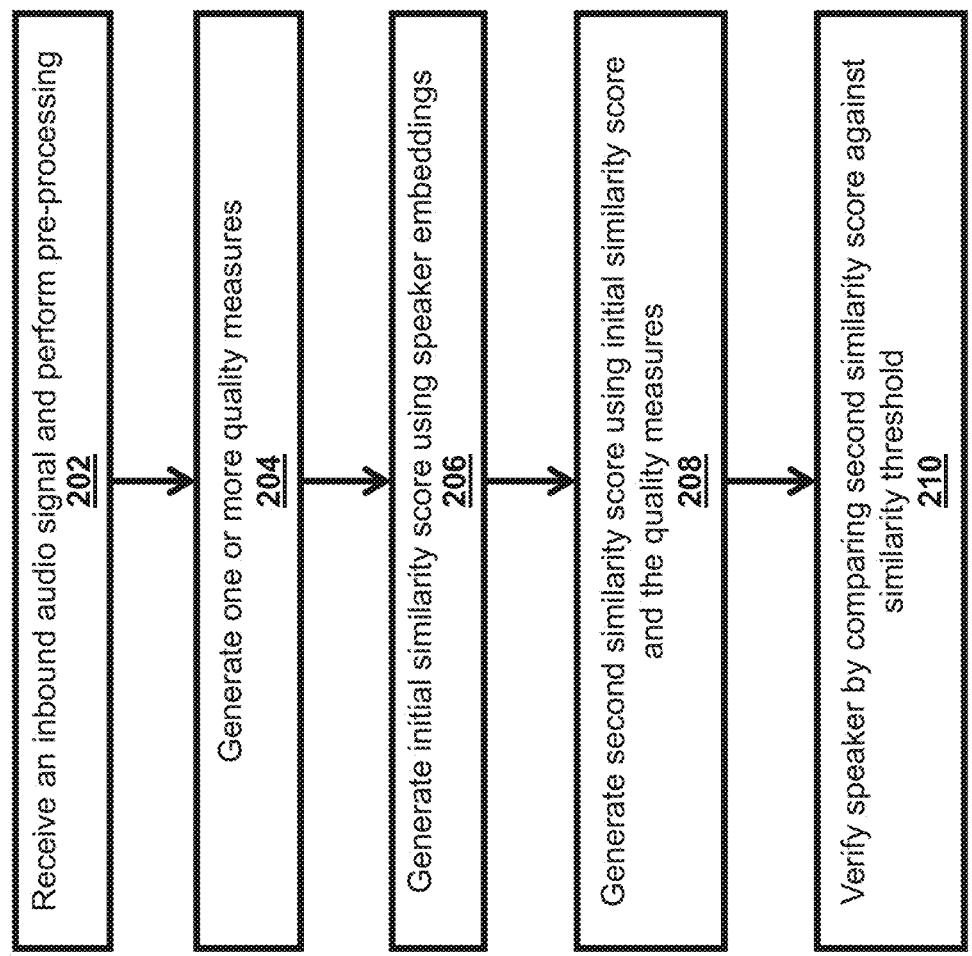
FIG. 2 shows steps of a method for implementing one or more machine-learning architectures for generating and implementing quality measures for processing audio signals.

FIG. 2 shows steps of a method 200 for implementing one or more machine-learning architectures for generating and implementing quality measures for processing audio signals. Embodiments may include additional, fewer, or different operations than those described in the method 200. The method 200 is performed by a server executing machine-readable software code of the neural network architectures, though it should be appreciated that the various operations may be performed by one or more computing devices and/or processors.

In step 202, the server receives an inbound audio signal and performs one or more pre-processing operations. These pre-processing operations include generating speech and non-speech portions and extraction acoustic audio features. The server implements a SAD engine to generate the speech and non-speech segments. The SAD engine further assess the duration of speech available during the speech segments. An inbound speaker of the caller provides various speech segments, which may include assertions of identity or other information for selecting one or more enrolled information (e.g., enrolled voiceprint, enrolled clean audio signals) about an enrolled speaker, which the server may retrieve from a database and reference executing the steps of the method 200.

In step 204, the server generates one or more quality measures by applying a quality engine machine-learning architecture. The quality engine extracts quality embeddings from the audio segments corresponding to predetermined quality descriptors, such as an audio event and a codec. The quality engine extracts the embeddings based upon the distances between the inbound speaker embeddings and expected enrolled speaker embeddings. The quality engine outputs these distances as quality measures for the corresponding acoustic descriptors to a score fusion operation.

In step 206, the server extracts an inbound speaker embedding for the inbound speaker by applying the speaker recognition engine or other fraud detection engine on the one or more acoustic features for the inbound audio signal. The speaker recognition engine then generates an initial similarity score based upon the similarities between the inbound speaker embedding and an enrollee voiceprint.

In step 208, the server generates a second similarity score using the initial similarity score and the one or more measures. The server may algorithmically combine the various quality measures (e.g., duration of speech, codec, audio event) to generate an overall quality measure. The server then algorithmically combines the initial similarity score with the overall quality measure or the one or more quality measure to generate the second similarity score.

In step 210, the server verifies the speaker by comparing the second similarity score against a similarity threshold. The server verifies that the inbound speaker as the enrolled speaker if the second similarity score satisfies the similarity threshold.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods are described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated.

The various aspects and embodiments disclosed are for purposes of illustration and are not intended to be limiting, with the true scope and spirit being indicated by the following claims.

What is claimed is:

1. A computer-implemented method comprising:
extracting from an inbound audio signal for an inbound speaker, by a computer, a feature vector for one or more acoustic features;
generating, by the computer, one or more quality measures and an overall quality measure for the inbound audio signal, by applying a first machine-learning architecture to the feature vector for the one or more acoustic features, the one or more quality measures corresponding to_a similarity between one or more expected quality descriptors and one or more quality descriptors for the call audio of the inbound audio signal;
extracting, by the computer, an inbound speaker embedding for the inbound speaker from the one or more acoustic features for the inbound audio signal, by applying a second machine-learning architecture to the feature vector for the one or more acoustic features of the inbound audio signal;
generating, by the computer, a first similarity score for the inbound speaker based upon the inbound speaker embedding and an enrolled voiceprint for an enrolled speaker, by applying the second machine-learning architecture;
generating, by the computer, a second similarity score for verifying the inbound speaker, the second similarity score generated based upon the one or more quality measures and the first similarity score; and
verifying, by the computer, the inbound speaker as the enrolled speaker based upon comparing the second similarity score against a verification threshold.

2. The method according to claim 1, wherein generating the one or more quality measures for the inbound audio signal includes generating, by the computer, the overall quality measure based upon each of the quality measures.

3. The method according to claim 1, wherein generating the one or more quality measures includes:
generating, by the computer, a plurality of speech segments from the inbound audio signal; and
determining, by the computer, a total duration of speech based upon the plurality of speech segments.

4. The method according to claim 1, wherein the first machine-learning architecture generates a quality embedding corresponding to each respective quality descriptor.

5. The method according to claim 4, wherein the quality descriptor includes at least one of an audio event descriptor, a codec descriptor, a microphone type descriptor, a device type, and a network type.

6. The method according to claim 1, wherein generating a quality measure includes determining, by the computer, a similarity between the inbound speaker embedding and a corresponding enrolled speaker embedding for an enrolled audio signal, wherein the quality measure is based upon the similarity.

7. The method according to claim 1, further comprising:
receiving, by the computer, one or more clean enrollment audio signals for the enrolled speaker;
generating, by the computer, one or more degraded enrollment audio signals corresponding to the one or more clean enrollment audio signals according to a type of degradation; and
extracting, by the computer, one or more enrolled quality embeddings for the enrolled speaker by applying the first machine-learning architecture on the one or more clean enrollment audio signals and the one or more degraded enrollment audio signals.

8. A system comprising:
a database configured store an enrolled voiceprint for an enrolled speaker; and
a server comprising a processor configured to:
extract from an inbound audio signal for an inbound speaker a feature vector for one or more acoustic features;
generate one or more quality measures and an overall quality measure for the inbound audio signal, by applying a first machine-learning architecture to the feature vector for the one or more acoustic features, the one or more quality measures corresponding to a similarity between one or more expected quality descriptors and one or more quality descriptors for the call audio of the inbound audio signal;
extract an inbound speaker embedding for the inbound speaker from the one or more acoustic features for the inbound audio signal, by applying a second machine-learning architecture to the feature vector for the one or more acoustic features of the inbound audio signal;
generate a first similarity score for the inbound speaker based upon the inbound speaker embedding and the enrolled voiceprint for the enrolled speaker, by applying the second machine-learning architecture;
generate a second similarity score for verifying the inbound speaker, the second similarity score generated based upon the one or more quality measures and the first similarity score; and
verify the inbound speaker as the enrolled speaker based upon comparing the second similarity score against a verification threshold.

9. The system according to claim 8, wherein when generating the one or more quality measures for the inbound audio signal, the server is further configured to generate the overall quality measure based upon each of the quality measures.

10. The system according to claim 8, wherein when generating the one or more quality measures, the server is further configured to:
generate a plurality of speech segments from the inbound audio signal; and
determine a total duration of speech based upon the plurality of speech segments.

11. The system according to claim 8, wherein when generating a quality measure the server is configured to:
determine a similarity between the inbound speaker embedding and a corresponding enrolled speaker embedding for an enrolled audio signal, wherein the quality measure is based upon the similarity.

12. The system according to claim 8, wherein the server is further configured to:
receive one or more clean enrollment audio signals for the enrolled speaker;
generate one or more degraded enrollment audio signals corresponding to the one or more clean enrollment audio signals according to a type of degradation; and
extract one or more enrolled quality embeddings for the enrolled speaker by applying the first machine-learning architecture on the one or more clean enrollment audio signals and the one or more degraded enrollment audio signals.

13. A non-transitory computer-readable medium comprising a non-transitory storage memory configured to store machine-readable instructions that when executed by a processor instruct the processor to:

extract from an inbound audio signal for an inbound speaker a feature vector for one or more acoustic features;

generate one or more quality measures and an overall quality measure for the inbound audio signal, by applying a first machine-learning architecture to the feature vector for the one or more acoustic features;

extract an inbound speaker embedding for the inbound speaker from the one or more acoustic features for the inbound audio signal, by applying a second machine-learning architecture to the feature vector for the one or more acoustic features of the inbound audio signal, the one or more quality measures corresponding to a similarity between one or more expected quality descriptors and one or more quality descriptors for the call audio of the inbound audio signal;

generate a first similarity score for the inbound speaker based upon the inbound speaker embedding and an enrolled voiceprint for an enrolled speaker, by applying the second machine-learning architecture;

generate a second similarity score for verifying the inbound speaker, the second similarity score generated based upon the one or more quality measures and the first similarity score; and verify the inbound speaker as the enrolled speaker based upon comparing the second similarity score against a verification threshold.

14. The computer-readable medium of claim 13, the processor further instructed to:

generate a plurality of speech segments from the inbound audio signal; and determine a total duration of speech based upon the plurality of speech segments.

15. The computer-readable medium of claim 13, wherein the first machine-learning architecture generates a quality embedding corresponding to each respective quality descriptor.

16. The computer-readable medium of claim 13, the processor further instructed to determine a similarity between the inbound speaker embedding and a corresponding enrolled speaker embedding for an enrolled audio signal, wherein a quality measure is based upon the similarity.

17. The computer-readable medium of claim 13, the processor further instructed to:

receive one or more clean enrollment audio signals for the enrolled speaker;

generate one or more degraded enrollment audio signals corresponding to the one or more clean enrollment audio signals according to a type of degradation; and extract one or more enrolled quality embeddings for the enrolled speaker by applying the first machine-learning architecture on the one or more clean enrollment audio signals and the one or more degraded enrollment audio signals.

* * * * *